INVENTOR
MICHEL ZIMMER

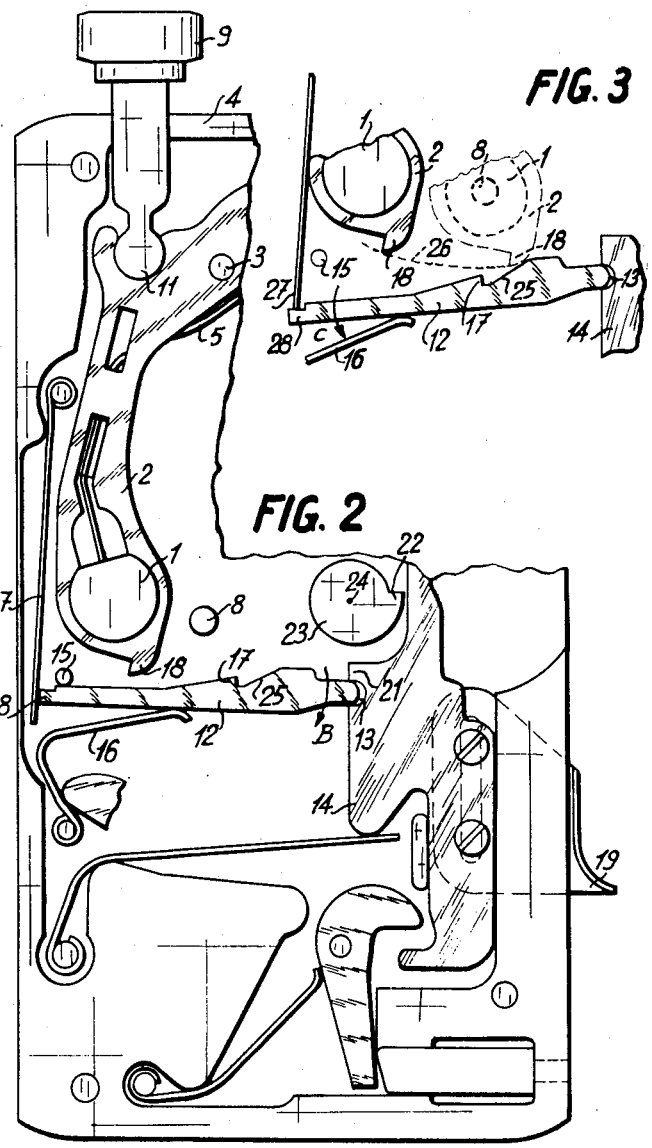

United States Patent Office 2,976,789
Patented Mar. 28, 1961

2,976,789

CAMERAS HAVING A PHOTOMETER WITH A PHOTOELECTRIC CELL

Michel Zimmer, Yverdon, Switzerland, assignor to Paillard S.A., Sainte-Croix, Switzerland, a corporation of Switzerland Filed May 19, 1959, Ser. No. 814,263

Claims priority, application Switzerland June 11, 1958

3 Claims. (Cl. 95—10)

Whilst no camera actually on the market is provided with a photometer of which the photo-electric cell is movable and located in the position of measurement in the luminous beam behind the objective, some publications indicate that such an arrangement has already been imagined, an arrangement in which the camera is provided with a separate control member which should be actuated equally well for bringing the photo-electric cell into the active position as also for its withdrawal out of the luminous beam passing through the objective. It has been appreciated that with such a construction there is the risk of forgetting to return the cell into the retracted position before taking a photograph.

The camera according to the invention is a camera of the type indicated above, that is to say having a photometer with a movable photo-electric cell, moved into the measuring position, in the luminous beam behind the objective, and which should be withdrawn from said beam during photographing. However, this camera is characterised by the fact that it has a device in mechanical connection with the release device of the camera, permitting of provoking the retraction of the photo-electric cell by actuating the said release device, thus avoiding any risk of defective actuation of the camera.

A form of construction of the camera according to the invention is shown diagrammatically and by way of example in the accompanying drawings, wherein:

Figs. 1 and 2 are partial views of the control mechanism of the camera, in two different positions.

Fig. 3 is a detail view of this mechanism, in a third position.

Figure 1:
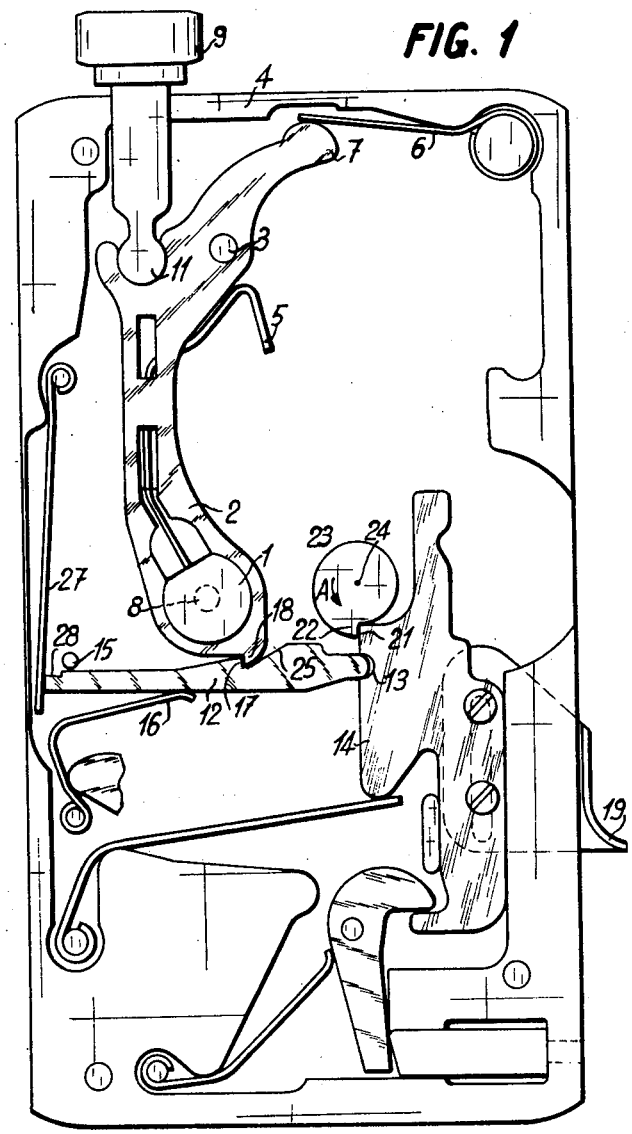

The camera shown comprises a photometer comprising a photo-electric cell 1 located on an arm of a movable support 2 pivoted on a spindle 3 secured to a plate 4 of the camera. Said cell is connected by a simple cable 5 to the galvanometer which is not shown.

Resilient return means are provided, constituted, in this instance, by a spring 6 which applies a pressure to a tail 7 of the arm 2 and tends to maintain said arm in the angular position shown in Fig. 2. In this position, the photo-electric cell 1 is withdrawn from the optical axis of the objective which coincides with an opening 8 of the plate.

A pressure exerted on a push-button 9, hinged to the arm 2 by means of a ball member 11, permits of moving the cell 1 into an advanced position shown in Fig. 1, in which the cell is then situated in front of the opening 8, that is to say in the luminous beam behind the objective. The arm 2 is maintained in this position by a locking lever 12 of which the right hand end relatively to the drawing, is hinged at 13 to a slide 14. The left hand end of the lever 12 bears against a stop pin 15, constituting a pivotal point against which the lever 12 is maintained by a spring 16.

In its central portion the lever 12 has a nose 17 capable of co-operating with a projection 18 of the arm of the support 2, with a view to retaining the said arm in its position shown in Fig. 1, against the action of the spring 6 which tends to return it into the position shown in Fig. 2.

The slide 14 is secured to the release device of the camera constituted by a staple 19 located on the side of the plate 4. Said slide has a nose 21 situated on the trajectory of the nose 22 of the rotary member 23 secured to a shaft 24 of the driving mechanism of the camera.

Said shaft, of which the direction of rotation is indicated by the arrow A (Fig. 1), is thus prevented from turning when the release of the camera is located in the stop position shown in Fig. 1.

On the contrary, during the lowering of the staple 19, the slide 14 is moved into a lower position shown in Fig. 2, in which the shaft 24 is no longer prevented from turning.

The lowering of the slide 14 has simultaneously the effect of causing the lever 12 to pivot on the pin 15, in the direction of the arrow B (Fig. 2), so that the arm of the support 2 is released and assumes, under the action of the spring 6, its retracted position shown in Fig. 2.

It will be seen that the actuation of the release staple 19 of the camera, automatically provokes the withdrawal of the photo-electric cell 1. For this reason the operator need not be pre-occupied on the position of the photo-electric cell and can concentrate his attention on the sighting or on any other operation.

The withdrawal of the cell may also be obtained without the intervention of the release.

For this end, the locking lever 12 is provided on the right of the nose 17, with an inclined stop surface 25 against which comes to bear the nose 18 of the arm 2, as indicated in dotted lines in Fig. 3, when a pressure is applied to the push-button 9 which is higher than that necessary for bringing the cell 1 into the active position.

The action of the arm 2 on the inclined plane 25 causes the locking lever 12 to pivot about its hinge 13 in the direction of the arrow C (see Fig. 3) in such a manner that the nose 17 is moved out of the trajectory of the arm 2 indicated at 26. In this position, shown in Fig. 3, an elastic blade 27 located substantially perpendicular to the lever 12 comes to lie under the free end 28 of said latter, whilst constituting a stop for the lever 12 which remains locked in its inclined position. The arm 2 may, therefore, resume its retracted position when the pressure on the pusher 9 is released. At the end of the stroke, under the action of the spring 6, the arm 2 abuts against the blade 27 which it pushes towards the left, thus releasing the locking lever 12 which then resumes its rest position shown in Fig. 1, in which position it, itself, serves as a stop for the blade 27.

Said mechanism may have modifications in construction. In particular, the retraction of the photo-electric cell 1 may be provided by shaping the noses 21, 22 and 17 in such a manner as to release the said cell for a weak stroke of the staple 19, said stroke, however, being insufficient for releasing the member 23, which remains locked, whilst the staple is not displaced over a longer stroke. Said device will eliminate the blade 27 and the inclined surface 25.

In any case, and even if the device 25, 27 is retained, it is preferable to shape the noses 21, 22 and 17 in such a manner that the cell is moved into the retracted position before the shaft 24 is released and sets photographing. In other words, the release of the nose 22 by the nose 21 should only take place when the nose 18 has already been released by the nose 17, in such a manner that the commencement of photographing is not hindered by the presence of the cell 1 in the active position.

I claim:

1. A camera having an objective, said camera comprising a photometer and including a photoelectric cell carried by a movable support arm from a retracted position to a measuring position in the luminous beam behind the objective, spring means normally urging said photoelectric cell into its retracted position, a release device for said camera, a slide in mechanical connection with said release device, a locking lever controlled by said release device having its one extremity hinged to said slide and its other free end bearing on a stationary stop pin, said lever having a nose adapted to hold back a projection on said support arm to retain said cell in the measuring position and for releasing said cell when said release device is operated to set said camera in operation, an inclined stop surface on said locking lever adjacent said nose whereby movement of said photoelectric cell from its measuring position to an extreme advanced position past said objective causes said projection to ride upon said inclined surface to depress the nose of said lever away from the trajectory of said support arm projection, and retaining means to hold said lever in this depressed position in order to permit of the return of said support arm to its retracted position.

2. A camera according to claim 1, wherein said retaining means comprises a movable stop member normally urged towards the free end of said lever, whereby when said photoelectric cell is in the extreme advanced position the depressed free end of said lever will engage said movable stop member and retain said lever in its depressed position, said movable stop member disposed in the trajectory of said movable support arm such that said arm when returned to its retracted position strikes said movable stop member to disengage same from its lever depressing position.

3. A camera according to claim 1, wherein said stop member comprises a longitudinal spring blade disposed at right angle to said locking lever and having one free end thereof proximate to said free end of said lever, said free end of said blade normally abutting said free end of said lever when said photoelectric cell is in its retracted and measuring positions, and said free end of said lever abutting said free end of said blade when said photoelectric cell is in its extreme advanced position.

References Cited in the file of this patent

UNITED STATES PATENTS

| | | |
|---|---|---|
| 2,194,031 | Riszdorfer | Mar. 19, 1940 |
| 2,302,597 | Bing | Nov. 17, 1942 |
| 2,579,247 | Angenieux | Dec. 18, 1951 |
| 2,895,394 | Muller | July 21, 1959 |

FOREIGN PATENTS

| | | |
|---|---|---|
| 633,140 | Great Britain | Dec. 12, 1949 |